(12) United States Patent
Nishino

(10) Patent No.: US 10,609,234 B2
(45) Date of Patent: Mar. 31, 2020

(54) IMAGE READING DEVICE AND IMAGE FORMING APPARATUS

(71) Applicant: KYOCERA Document Solutions Inc., Osaka (JP)

(72) Inventor: Tetsuya Nishino, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/019,576

(22) Filed: Jun. 27, 2018

(65) Prior Publication Data

US 2019/0007564 A1    Jan. 3, 2019

(30) Foreign Application Priority Data

Jun. 28, 2017   (JP) .................. 2017-126000

(51) Int. Cl.
*H04N 1/04* (2006.01)
*H04N 1/00* (2006.01)
*H04N 1/12* (2006.01)
*G03G 15/20* (2006.01)
*H04N 1/56* (2006.01)

(52) U.S. Cl.
CPC .......... *H04N 1/0057* (2013.01); *G03G 15/20* (2013.01); *H04N 1/00023* (2013.01); *H04N 1/00037* (2013.01); *H04N 1/121* (2013.01); *H04N 1/56* (2013.01)

(58) Field of Classification Search
CPC ............. H04N 1/0057; H04N 1/00023; H04N 1/00037; H04N 1/121; H04N 1/56; G03G 15/20

USPC ......................... 358/505, 504, 523, 1.15, 403
See application file for complete search history.

(56) References Cited

U.S. PATENT DOCUMENTS

| | | | | | |
|---|---|---|---|---|---|
| 5,220,417 | A | * | 6/1993 | Sugiura | ............. H04N 1/33307 347/3 |
| 5,361,144 | A | * | 11/1994 | Sugiura | ............. H04N 1/33307 358/500 |
| 5,999,644 | A | * | 12/1999 | Sugiura | ............. H04N 1/33307 358/500 |
| 9,204,017 | B2 | * | 12/2015 | Komatsu | ............. H04N 1/6077 |

(Continued)

FOREIGN PATENT DOCUMENTS

| JP | 06189100 A * | 7/1994 |
|---|---|---|
| JP | 2009-027328 A | 2/2009 |

*Primary Examiner* — Cheukfan Lee
(74) *Attorney, Agent, or Firm* — Studebaker & Brackett PC

(57) ABSTRACT

An image forming apparatus includes a reading section, a detection section, a determination section, and a decision section. The reading section reads an image of a first document and generates a document information item indicating the image and a sheet color of the first document. The reading section also reads an image of a second document and generates a document information item indicating the image and a sheet color of the second document. The detection section detects sheet colors based on the respective document information items. The determination section determines whether or not the sheet color each match any one of specific colors other than the white color. When the determination section determines that a sheet color matches one of the specific colors, the decision section decides a transmission address of the document information items based the one specific color.

12 Claims, 11 Drawing Sheets

(56) References Cited

U.S. PATENT DOCUMENTS

| | | | |
|---|---|---|---|
| 2012/0224232 A1* | 9/2012 | Matulic | G06K 9/00456 358/402 |
| 2013/0016400 A1* | 1/2013 | Yamashita | H04N 1/32702 358/1.18 |
| 2015/0172514 A1* | 6/2015 | Komatsu | H04N 1/6077 358/504 |
| 2015/0220819 A1* | 8/2015 | Yamamoto | G06K 15/027 358/1.9 |
| 2015/0242729 A1* | 8/2015 | Oura | G06K 15/1868 358/1.15 |
| 2016/0255232 A1* | 9/2016 | Ooishi | H04N 1/00968 358/2.1 |

* cited by examiner

| Identification No. (NB) | Color value range (RC) | | | Transmission address (AD) |
|---|---|---|---|---|
| | R (RC1) | G (RC2) | B (RC3) | |
| 1 | 200<R≦255 | G≦50 | B≦50 | aaa@abc.co.jp |
| 2 | R≦50 | 200<G≦255 | B≦50 | bbb@def.co.jp |
| 3 | R≦50 | G≦50 | 200<B≦255 | ccc@ghi.co.jp |
| ⋮ | ⋮ | ⋮ | ⋮ | ⋮ |

FIG. 4

IMAGE READING DEVICE AND IMAGE FORMING APPARATUS

INCORPORATION BY REFERENCE

The present application claims priority under 35 U.S.C. § 119 to Japanese Patent Application No. 2017-126000, filed on Jun. 28, 2017. The contents of this application are incorporated herein by reference in their entirety.

BACKGROUND

The present disclosure relates to an image reading device and an image forming apparatus.

Some image forming apparatus determines a transmission unit on an image format by image format basis in conversion of image information generated by reading an image of a document into an image format. The image forming apparatus divides the image information converted into the image format on a unit by unit basis of the transmission unit basis and transmits the divided image information to a host device.

SUMMARY

An image reading device according to the present disclosure is an image reading device that reads an image described on a document. The image reading device includes a reading section, a detection section, a determination section, and a decision section. The reading section reads the document and generates a document information item indicating the image and a color of a recording medium of the document. The detection section detects the color of the recording medium of the document based on the document information item. The determination section determines whether or not the color of the recording medium of the document matches any one specific color of a plurality of specific colors. When the determination section determines that the color of the recording medium of the document matches one specific color of the specific colors, the decision section decides a transmission address of the document information item based on the one specific color.

An image forming apparatus according to the present disclosure includes an image reading device that reads an image described on a document. The image forming apparatus includes a reading section, a detection section, a determination section, and a decision section. The reading section reads the document and generates a document information item indicating the image and a color of a recording medium of the document. The detection section detects the color of the recording medium of the document based on the document information item. The determination section determines whether or not the color of the recording medium of the document matches any one specific color of a plurality of specific colors. When the determination section determines that the color of the recording medium of the document matches one specific color of the specific colors, the decision section decides a transmission address of the document information item based on the one specific color.

BRIEF DESCRIPTION OF THE DRAWINGS

FIG. 4 is a diagram illustrating information stored in a color storage section.

FIG. 6A is a diagram illustrating a state of the second documents each being placed on one of the first documents that each corresponds to one of the second documents. FIG. 6B is a diagram illustrating a state of the second documents each being placed beneath one of the first documents that each corresponds to one of the second documents.

DETAILED DESCRIPTION

Figure 1:
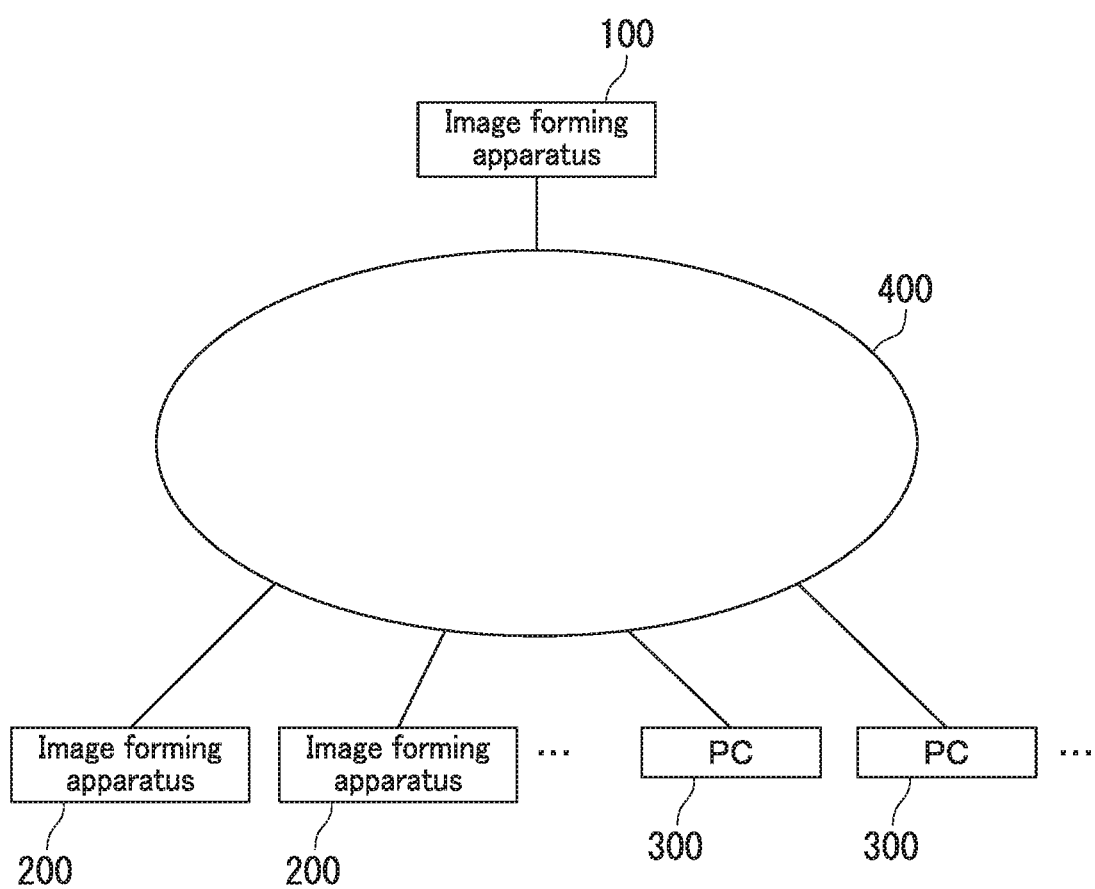
FIG. 1 is a diagram illustrating a connection state of an image forming apparatus according to an embodiment of the present disclosure.

Description will be made below about an embodiment of the present disclosure with reference to the accompanying drawings (FIGS. 1-11). It should be noted that elements in the drawings that are the same or equivalent are labelled using the same reference signs and description thereof is not repeated.

The following describes a connection state of an image forming apparatus 100 according to the embodiment of the present disclosure with reference to FIG. 1. As illustrated in FIG. 1, the image forming apparatus 100 is communicatively connected to a plurality of personal computers (PCs) 300 and a plurality of image forming apparatuses 200 other than the image forming apparatus 100 via a network 400.

The image forming apparatus 100 and the image forming apparatuses 200 each are a so-called multifunction peripheral and each have a communication function. The image forming apparatus 100 transmits and receives image information to and from the image forming apparatuses 200 via the network 400.

The personal computers 300 each have a communication function. The image forming apparatus 100 transmits and receives image information to and from the personal computers 300 via the network 400.

The network 400 is for example the Internet. The network 400 is not limited to the Internet. The network 400 may be a local area network (LAN) or a wide area network (WAN).

As described with reference to FIG. 1, the image forming apparatus 100 is communicatively connected to the image forming apparatuses 200 and the personal computers 300, which however should not be taken to limit the present disclosure. It is only required that the image forming apparatus 100 is communicatively connected to a plurality of devices. The devices may be for example smartphones.

Figure 2:
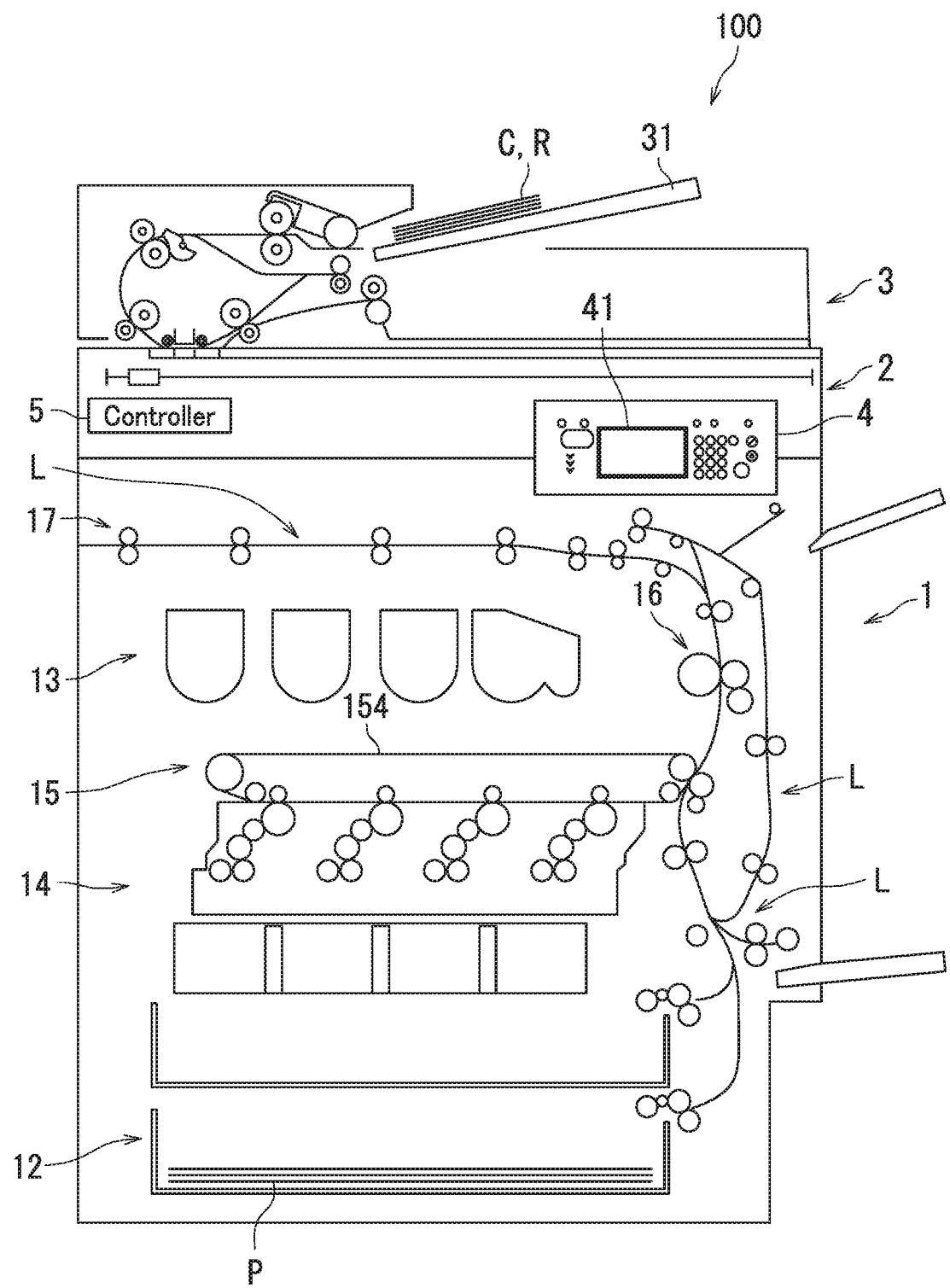
FIG. 2 is a diagram illustrating a configuration of the image forming apparatus according to the embodiment of the present disclosure.

The following describes a configuration of the image forming apparatus 100 according to the present embodiment with reference to FIGS. 1 and 2. FIG. 2 is a diagram illustrating the configuration of the image forming apparatus 100. The image forming apparatus 100 is a color multifunction peripheral. The image forming apparatus 100 reads images of first documents R and second documents C and forms images on paper P with toner. The first documents R each are a document of at least one sheet in a white color. The second documents C each are a document of a sheet in a color other than the white color.

As illustrated in FIG. 2, the image forming apparatus 100 includes an image forming unit 1, an image reading unit 2, a document conveyance unit 3, an operation display section 4, and a controller 5. The image forming unit 1 forms images on paper P. The image reading unit 2 reads respective images of the first documents R and the second documents C and generates respective image information items. The document conveyance unit 3 conveys the first documents R and the second documents C to the image reading unit 2. The document conveyance unit 3 includes a feeding tray 31. The first documents R and the second documents C are loaded on the feeding tray 31 in a stacked manner. The controller 5 controls operation of the image forming apparatus 100. The image reading unit 2 corresponds to a part of an "image reading device". The document conveyance unit 3 corresponds to an example of a "feeding section". The image forming unit 1 corresponds to a part of an "image forming section".

Each of the first documents R includes at least one first sheet in the white color. The first sheet has an image formed thereon. The white color corresponds to an example of a "basic color". Each of the second documents C includes a second sheet in a color other than the white color (e.g., red color, green color, or blue color). The second sheet has an image formed thereon. Note that the second sheet may have no image thereon. The second sheet has no image formed thereon in the embodiment of the present disclosure. The second documents C are each placed on or beneath a corresponding one of the first documents R stacked on one another.

The image forming unit 1 includes a feeding section 12, a conveyor section L, a toner supply section 13, a formation executing section 14, a fixing section 16, and an ejection section 17. The formation executing section 14 includes a transfer section 15.

The feeding section 12 feeds paper P to the conveyor section L. The conveyor section L conveys the paper P to the ejection section 17 via the transfer section 15 and the fixing section 16. The paper P corresponds to an example of "another recording medium".

The toner supply section 13 supplies toner to the formation executing section 14. The formation executing section 14 forms an image on the paper P.

The transfer section 15 includes an intermediate transfer belt 154. The formation executing section 14 transfers onto the intermediate transfer belt 154 toner images in respective colors of cyan, magenta, yellow, and black. The toner images in the respective colors are superimposed on the intermediate transfer belt 154 to form an image on the intermediate transfer belt 154. The transfer section 15 transfers the image formed on the intermediate transfer belt 154 onto the paper P. Through the above, the image is formed on the paper P.

The fixing section 16 fixes the image formed on the paper P to the paper P by applying heat and pressure to the paper P. The ejection section 17 ejects the paper P out of the image forming apparatus 100.

The operation display section 4 receives user operation. The operation display section 4 includes a touch panel 41. The touch panel 41 includes for example a liquid crystal display (LCD) to display various images. The touch panel 41 further includes a touch sensor to receive user operation.

Figure 3:
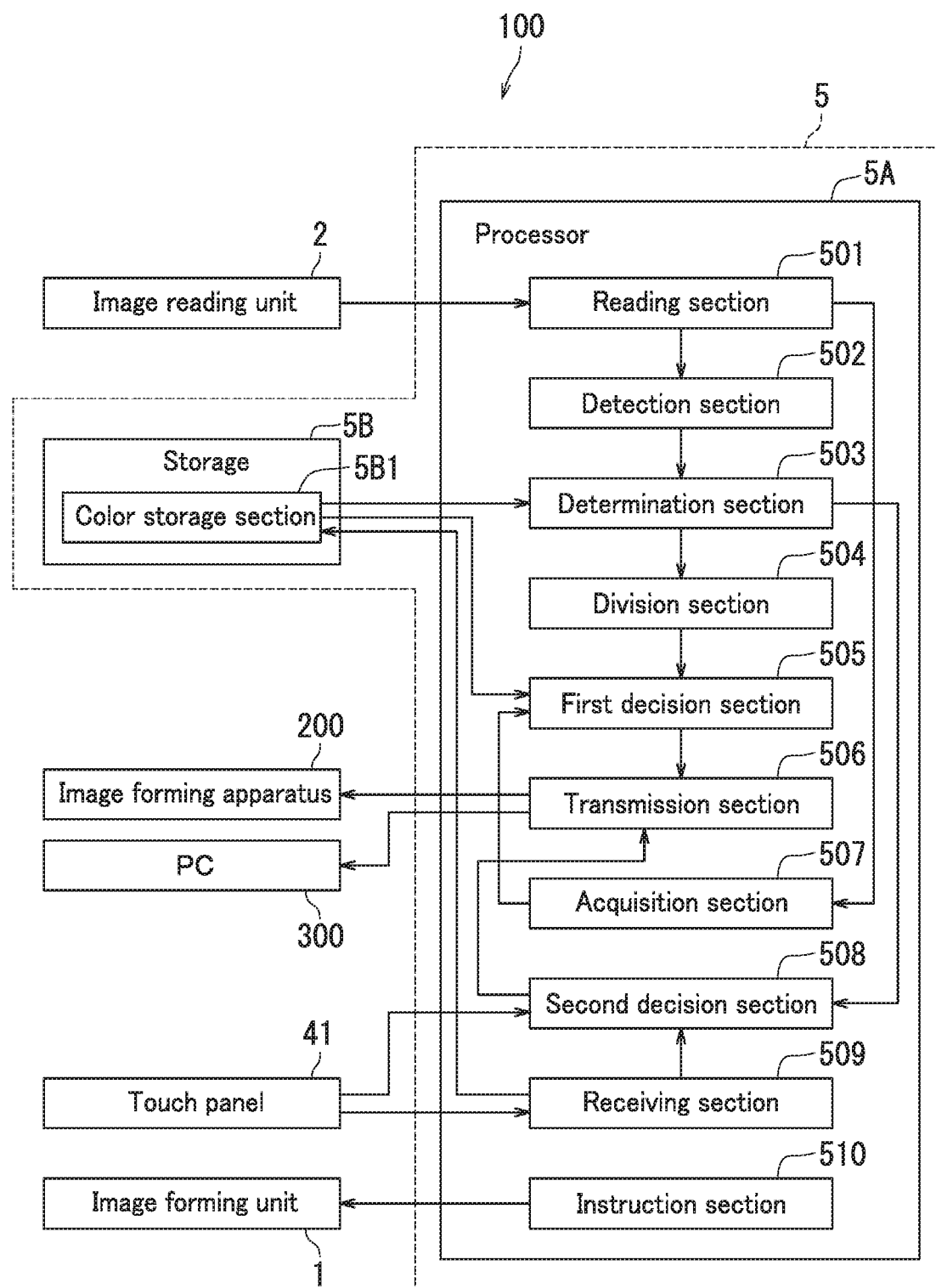
FIG. 3 is a block diagram illustrating a configuration of a controller according to the embodiment of the present disclosure.

The following describes a configuration of the controller 5 according to the embodiment of the present disclosure with reference to FIGS. 1 to 3. FIG. 3 is a block diagram illustrating the configuration of the controller 5. As illustrated in FIG. 3, the controller 5 includes a processor 5A and storage 5B. The processor 5A includes for example a central processing unit (CPU). The storage 5B includes memory such as semiconductor memory and may include a hard disk drive (HDD). The storage 5B stores control programs therein. The controller 5 corresponds to a part of the "image reading device".

The processor 5A includes a reading section 501, a detection section 502, a determination section 503, a division section 504, a first decision section 505, a transmission section 506, an acquisition section 507, a second decision section 508, a receiving section 509, and an instruction section 510. Specifically, the processor 5A executes the control programs to function as the reading section 501, the detection section 502, the determination section 503, the division section 504, the first decision section 505, the transmission section 506, the acquisition section 507, the second decision section 508, the receiving section 509, and the instruction section 510. The storage 5B includes a color storage section 5B1.

The color storage section 5B1 stores therein information items indicating respective specific colors SC in association with information items indicating respective transmission addresses AD of a plurality of document information items MJ.

The reading section 501 reads images of the first documents R through the image reading unit 2 and generates document information items MJ indicating the images and sheet colors CA of the respective first documents R. The reading section 501 reads images of the second documents C through the image reading unit 2 and generates document information items MJ indicating the images and sheet colors CA of the respective second documents C. Through the above, the reading section 501 generates the plurality of document information items MJ.

The detection section 502 detects each sheet color CA of the first documents R and the second documents C based on the respective document information items MJ. The sheet colors CA each correspond to an example of "a color of a recording medium".

The determination section 503 determines whether or not the sheet color CA detected by the detection section 502 is the white color. The determination section 503 further determines whether or not the sheet color CA detected by the detection section 502 matches any one specific color SC of the specific colors SC other than the white color.

The division section 504 divides the document information items MJ into a specific number NJ of document information item groups MJA based on a specific number NC of the second documents C. The specific number NJ of the document information item groups MJA is equal to the specific number NC of the second documents C. The specific number NJ of document information item groups MJA each include a document information item MJ of one of the first documents R and a document information item MJ of a second document C corresponding to the one first document.

When the determination section 503 determines that the sheet color CA matches any one of the specific colors SC, the first decision section 505 decides a transmission address AD of corresponding document information items MJ based on the one specific color SC. The first decision section 505 corresponds to a part of a "decision section".

The transmission section 506 transmits the document information items MJ to the transmission address AD decided by the first decision section 505. Specifically, the transmission section 506 transmits the document information items MJ included in the respective specific number NJ of document information item groups MJA to respective transmission addresses AD decided by the first decision section 505.

When the determination section 503 determines that the sheet color CA matches any one of the specific colors SC, the acquisition section 507 acquires text information contained in a document information item MJ.

When the determination section 503 determines that the sheet color CA is not the white color and does not match any one of the specific colors SC, the second decision section 508 decides a transmission address AD of the document information items MJ of the second document C in the sheet color CA and a corresponding first document R. The second decision section 508 corresponds to a part of the "decision section".

When the determination section 503 determines that the sheet color CA is not the white color and does not match any one of the specific colors SC, the receiving section 509 receives the transmission address AD decided by the second decision section 508.

The instruction section 510 instructs the image forming unit 1 to form on paper P an image indicating the specific color SC and an image indicating the transmission address AD in association with each other.

As described above with reference to FIGS. 1 to 3, the determination section 503 determines whether or not each sheet color CA matches any one of the specific colors SC in the embodiment of the present disclosure. When the determination section 503 determines that the sheet color CA matches one of the specific colors SC, the first decision section 505 decides a transmission address AD of corresponding document information items MJ based on the one specific color SC. In the above configuration, the transmission address AD can be easily decided as desired for transmission of document information items MJ through the reading section 501 reading a sheet PA in a sheet color CA (second document C) corresponding to a transmission address AD that a user desires.

The following describes information stored in the color storage section 5B1 with reference to FIGS. 1 to 4. FIG. 4 is a diagram indicating the information stored in the color storage section 5B1. As indicated in FIG. 4, the color storage section 5B1 stores therein identification numbers NB, color value ranges RC, and transmission addresses AD in association with one another.

The identification numbers NB are numbers identifying the respective specific colors SC defined by their color value ranges RC.

The color value ranges RC each define a specific color SC. The color value ranges RC each include an R color component RC1, a G color component RC2, and a B color component RC3. The R color component RC1 defines a range of an R (red) color component of a specific color SC. The G color component RC2 defines a range of a G (green) color component of the specific color SC. The B color component RC3 defines a range of a B (blue) color component of the specific color SC. Each of the R color component RC1, the G color component RC2, and the B color component RC3 is defined for example with eight bits (256 levels). The R color component RC1 allotted to an identification number NB of "1" is a range of greater than 200 and no greater than 255. The G color component RC2 allotted to the identification number NB of "1" is a range of no greater than 50. The B color component RC3 allotted to the identification number NB of "1" is a range of no greater than 50. The color value range RC allotted to the identification number of "1" represents for example a sheet color CA of a sheet in a red color.

The transmission addresses AD each are for example an email address. For example, a transmission address AD allotted to the identification number NB of "1" is "aaa@abc.co.jp".

The determination section 503 determines based on the color value range RC whether or not the sheet color CA detected by the detection section 502 matches any one of the specific colors SC. Specifically, the determination section 503 determines whether or not the sheet color CA matches any one of the specific colors SC according to whether or not the color value of the sheet color CA falls in a color value range RC defined for any one of the specific colors SC.

The first decision section 505 reads out a transmission address AD from the color storage section 5B1 and decides the read one as a transmission address AD. The transmission address AD corresponds to one of the specific colors SC. The one specific color SC has a color value range RC in which the color value of the sheet color CA is determined to fall by the determination section 503.

As described with reference to FIGS. 1 to 4, the first decision section 505 decides a transmission address AD by reading out an information item indicating the transmission address AD from the color storage section 5B1 in the embodiment of the present disclosure. The transmission address AD corresponds to one specific color SC that is determined to match the sheet color CA by the determination section 503. In the above configuration, the first decision section 505 can perform appropriate decision of a transmission address AD. Thus, a transmission address AD of document information items MJ can be appropriately decided as desired.

Furthermore, the determination section 503 determines based on the color value ranges RC whether or not the sheet color CA detected by the detection section 502 matches any one of the specific colors SC. In the above configuration, appropriate setting of a color value range RC can result in appropriate definition of a sheet color CA of a second document C.

In addition, the instruction section 510 instructs the image forming unit 1 to form on paper P an image indicating the specific color SC and an image indicating the decided transmission addresses AD in association with each other. In the above configuration, the user can readily confirm the transmission addresses AD corresponding to the respective specific colors SC.

Figure 5:
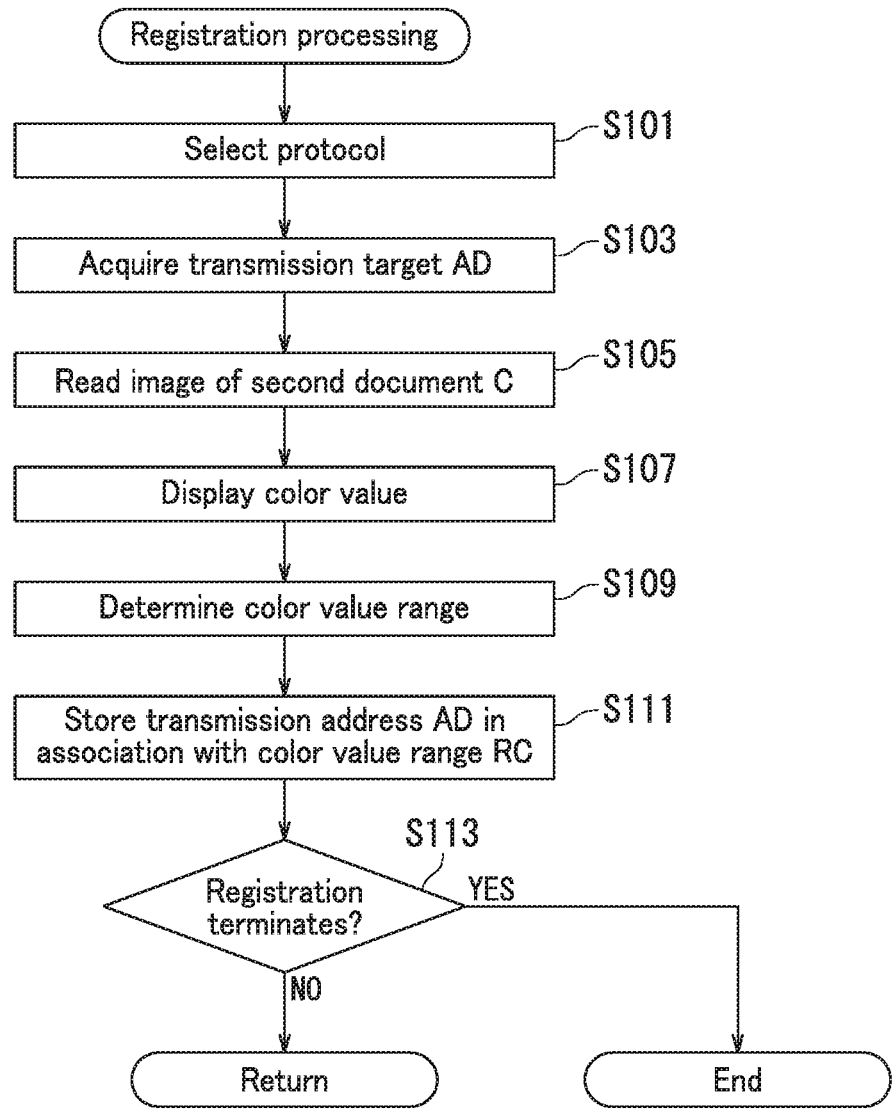
FIG. 5 is a flowchart depicting registration processing that the controller performs.

The following describes "registration processing" that the controller 5 performs with reference to FIGS. 1 to 5. FIG. 5 is a flowchart depicting the registration processing. The registration processing refers to processing to store in the color storage section 5B1 a color value range RC and a transmission address AD in association with each other.

First at Step S101, the controller 5 selects a protocol for use in transmission of document information items MJ based on user operation on the touch panel 41. Examples of the protocol include a simple mail transfer protocol (SMTP), a file transfer protocol (FTP), and a server message block (SMB). A case where the SMTP is selected is described in the embodiment of the present disclosure.

At Step S103, the controller 5 acquires a transmission address AD based on user operation on the touch panel 41.

At Step S105, the controller 5 reads an image of a second document C to generate a document information item MJ.

At step S107, the controller 5 calculates a color value of a sheet color CA of the second document C based on the document information item MJ generated at Step S105 and displays the calculated color value on the touch panel 41.

At Step S109, the controller 5 determines a color value range RC based on user operation on the touch panel 41.

At Step S111, the controller 5 stores in the color storage section 5B1 the transmission address AD acquired at Step S103 and the color value range RC determined at Step S109 in association with each other.

At Step S113, the controller 5 determines whether or not to terminate the registration processing based on user operation on the touch panel 41.

When it is determined to terminate the registration processing (YES at Step S113), the processing ends. When it is determined not to terminate the registration processing (NO at Step S113), the processing returns to Step S101.

As described with reference to FIGS. 1 to 5, the controller 5 executes the registration processing to store a color value range RC and a transmission address AD in association with each other in the color storage section 5B1 in the embodiment of the present disclosure. In the above configuration, the user can easily store a color value range RC and a transmission address AD in the color storage section 5B1.

Figure 6A:
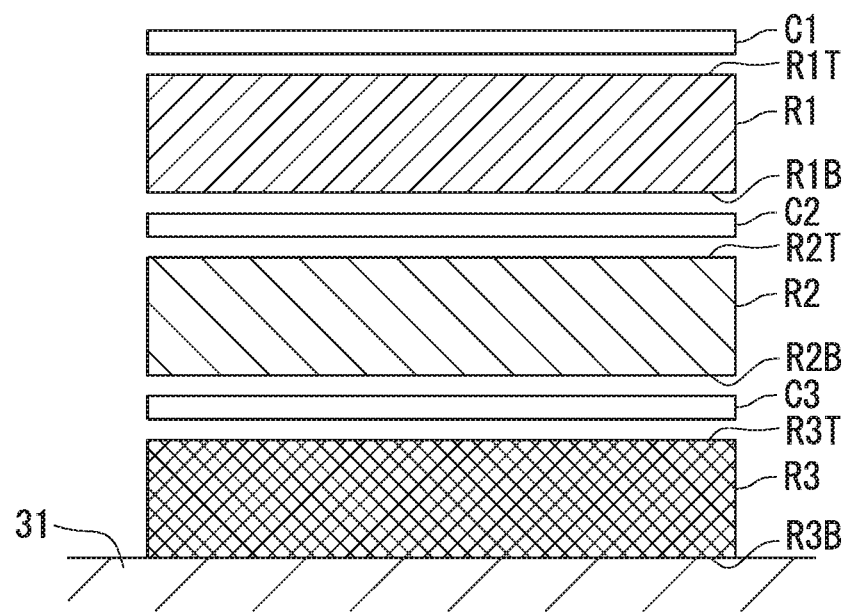
FIGS. 6A and 6B illustrate first documents and second documents loaded on a paper feed tray.
Figure 6B:
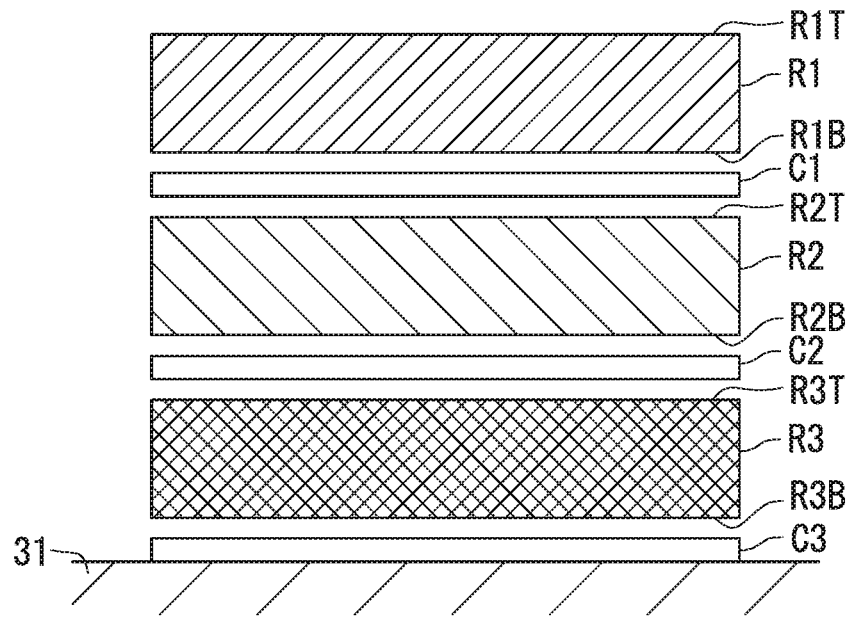

The following describes cases where second documents C and first documents R are loaded on the feeding tray 31 with reference to FIGS. 1 to 6B. FIGS. 6A and 6B illustrate the second documents C and the first documents R loaded on the feeding tray 31. The second documents C each represent a transmission address of a document information item MJ of a corresponding one of the first documents R. Specifically, each sheet color CA of the second documents C matches any one of the specific colors SC and corresponds to one transmission address AD. FIG. 6A is a diagram illustrating a state in which each of the second documents C is placed on one of the first documents R corresponding to the second document C. FIG. 6B is a diagram illustrating a state in which each of the second documents C is placed beneath one of the first documents R corresponding to the second document C. The phrase "one of the first documents R corresponding to the second document C" means that the second document C represents a transmission address AD of a document information item MJ of the one of the first documents R.

As illustrated in FIGS. 6A and 6B, the second documents C include a second document C1, a second document C2, and a second document C3. The first documents R include a first document R1, a first document R2, and a first document R3. The second documents C1, C2, and C3 and the first documents R1, R2, and R3 are loaded on the feeding tray 31. In the following description, an uppermost sheet of the first document R1 will be referred to as a first document sheet R1T and a lowermost sheet thereof will be referred to as a first document sheet R1B. Also, an uppermost sheet of the first document R2 will be referred to as a first document sheet R2T and a lowermost sheet thereof will be referred to as a first document sheet R2B. An uppermost sheet of the first document R3 will be referred to as a first document sheet R3T and a lowermost sheet thereof will be referred to as a first document sheet R3B.

As illustrated in FIG. 6A, the second document C1, the first document R1, the second document C2, the first document R2, the second document C3, and the first document R3 are stacked in the stated order from top to bottom on the feeding tray 31. The second document C1 represents a transmission address AD of a document information item MJ of the first document R1. The second document C2 represents a transmission address AD of a document information item MJ of the first document R2. The second document C3 represents a transmission address AD of a document information item MJ of the first document R3.

In the above case, the division section 504 divides document information items MJ into the specific number NJ of document information item groups MJA between each document information item MJ corresponding to one of the second documents C and a document information item MJ corresponding to a first document R read directly before the one second document C. Specifically, the division section 504 divides the document information items MJ between a document information item MJ corresponding to the second document C2 and the document information item MJ corresponding to the first document R1 including the first document sheet R1B read directly before the second document C2. Further, the division section 504 divides the document information items MJ between a document information item MJ corresponding to the second document C3 and the document information item MJ corresponding to the first document R2 including the first document sheet R2B read directly before the second document C3. Further specifically, the division section 504 divides the document information items MJ into a first document information item group MJ1, a second document information item group MJ2, and a third document information item group MJ3. The first document information item group MJ1 includes respective document information items MJ of the second document C1 and the first document R1 read before the second document C2 is read. The second document information item group MJ2 includes the respective document information items MJ of the second document C2 and the first document R2 read before the second document C3 is read. The third document information item group MJ3 includes the respective document information items MJ of the second document C3 and the first document R3 read after the second document C3 is read.

As illustrated in FIG. 6B, the first document R1, the second document C1, the first document R2, the second document C2, the first document R3, and the second document C3 are stacked in the stated order from top to bottom on the feeding tray 31. The second document C1 represents the transmission address AD of the document information item MJ of the first document R1. The second document C2 represents the transmission address AD of the document information item MJ of the first document R2. The second document C3 represents the transmission address AD of the document information item MJ of the first document R3.

In the above case, the division section 504 divides the document information items MJ into the specific number NJ of document information item groups MJA between each document information item MJ corresponding to one of the second documents C and a document information item MJ corresponding to a first document R read directly after the one second document C. Specifically, the division section 504 divides the document information items MJ between the document information item MJ corresponding to the second document C1 and the document information item MJ corresponding to the first document R2 including the first document sheet R2T read directly after the second document C1. Further, the division section 504 divides the document information items MJ between the document information item MJ corresponding to the second document C2 and the document information item MJ corresponding to the first document R3 including the first document sheet R3T read directly after the second document C2. The division section 504 divides the document information items MJ into the first document information item group MJ1, the second document information item group MJ2, and the third document information item group MJ3. The first document information item group MJ1 includes the respective document information items MJ of the second document C1 and the first document R1 read before or at the same time as the second document C1 is read. The second document information item group MJ2 includes the respective document information items MJ of the second document C2 and the first document R2 read before or at the same time as the second document C2 is read. The third document information item group MJ3 includes the respective document information items MJ of the second document C3 and the first document R3 read before or at the same time as the second document C3 is read.

The transmission section 506 transmits the specific number NJ of document information item groups MJA (first to third document information item groups MJ1 to MJ3) to respective transmission addresses AD decided by the first decision section 505. Specifically, the transmission section 506 transmits the first document information item group MJ to a first transmission address AD1 represented by the second document C1. The transmission section 506 also transmits the second document information item group MJ2 to a second transmission address AD2 represented by the second document C2. The transmission section 506 further transmits the third document information item group MJ3 to a third transmission address AD3 represented by the second document C3.

As described with reference to FIGS. 1 to 6B, in a situation in which each of the second documents C is placed on one of the first documents R corresponding to the second document C, the division section 504 divides the document information items MJ into the specific number NJ of document information item groups MJA between each document information item MJ corresponding to one of the second documents C and a document information item MJ corresponding to a first document R read directly before the one second document C. The specific number NJ is equal to the specific number NC. The specific number NC represents the number of the second documents C. In the above configuration, when the specific number NC of second documents C and the first documents R including the specific number NC or more of sheets are stacked such that the second documents C representing the transmission addresses AD of the respective first documents R are to be read by the reading section 501 directly before the respective first documents R, the document information items MJ can be divided into the specific number NJ of document information item groups MJA on a transmission address AD by transmission address AD basis.

By contrast, in a situation in which each of the second documents C is placed beneath one of the first documents R corresponding to the second document C, the division section 504 divides the document information items MJ into the specific number NJ of document information item groups MJA between each document information item MJ corresponding to one of the second documents C and a document information item MJ corresponding to a first document R read directly after the one second document C. In the above configuration, when the specific number NC of the second documents C and the first documents R including the specific number NC or more of sheets are stacked such that the second documents C representing the transmission addresses AD of the respective first documents R are to be read by the reading section 501 directly after the respective first documents R, the document information items MJ can be divided into the specific number NJ of document information item groups MJA on the transmission address AD by transmission address AD basis.

In addition, the transmission section 506 transmits document information items MJ included in the respective specific number NJ of document information item groups MJA to the respective transmission addresses AD decided by the first decision section 505. In the above configuration, when the user stacks the second documents C in the specific colors SC representing respective transmission addresses AD in association with the respective first documents R, the document information items MJ included in the respective specific number NJ of document information item groups MJA can be transmitted to respective appropriate transmission addresses AD.

Figure 7:
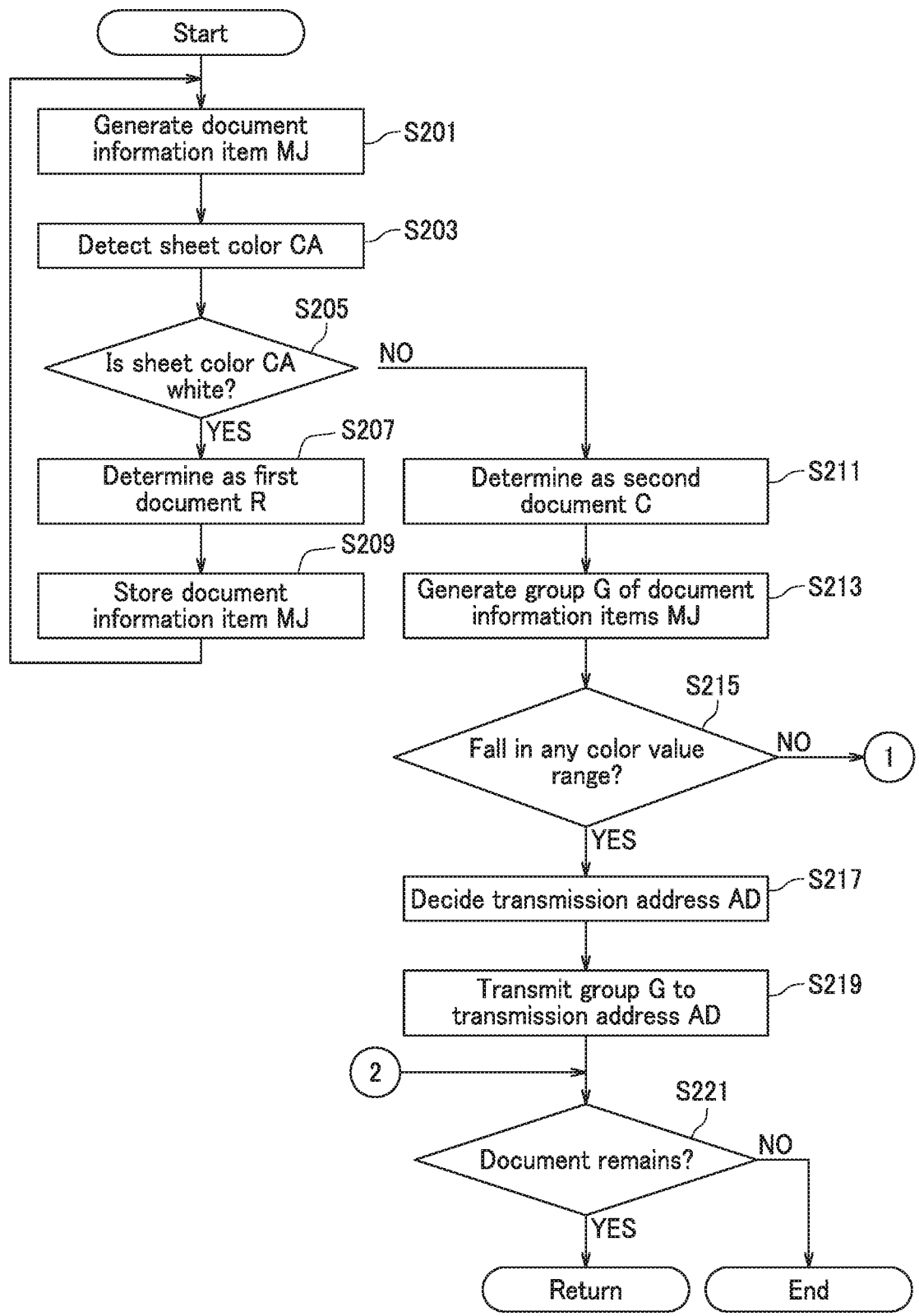
FIG. 7 is a flowchart depicting an example of processing that the controller performs.
Figure 8:
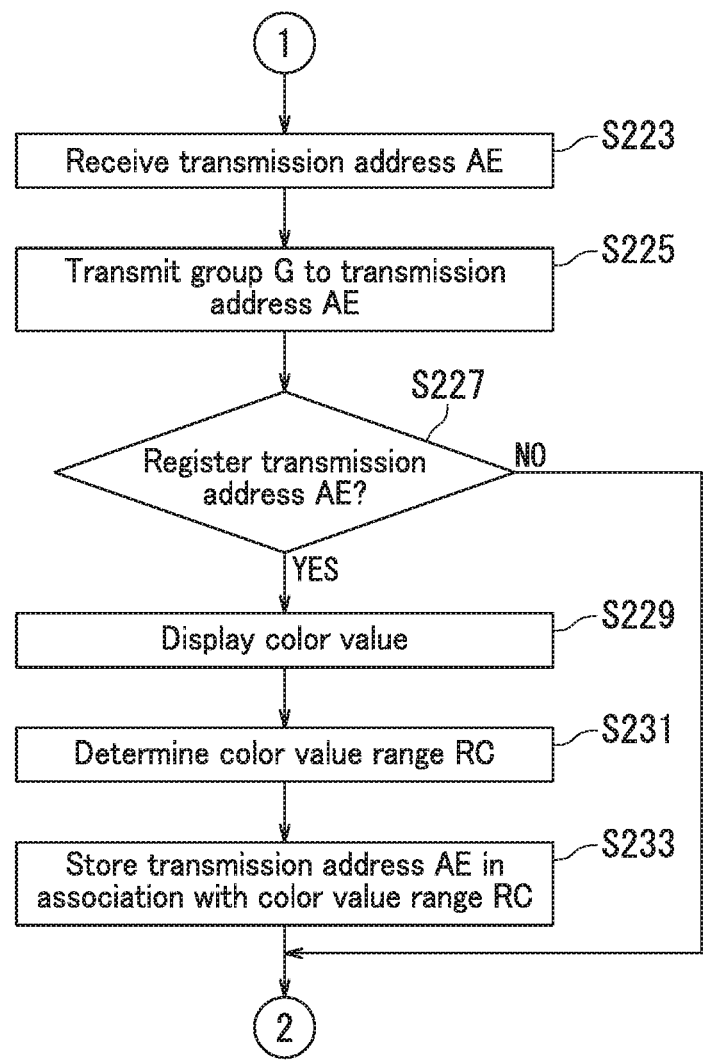
FIG. 8 is a flowchart depicting the example of processing that the controller performs.

The following describes processing that the controller 5 performs with reference to FIGS. 1 to 8. FIGS. 7 and 8 are flowcharts depicting an example of the processing that the controller 5 performs. Description will be made with reference to FIGS. 7 and 8 about a case where each of the second documents C is placed beneath one of the first documents R corresponding to the second document C, as illustrated in FIG. 6B.

First at Step S201, the reading section 501 reads an image of one of the first documents R through the image reading unit 2 and generates a document information item MJ indicating a sheet color CA and the image of the first document R. Alternatively, the reading section 501 reads an image of one of the second documents C through the image reading unit 2 and generates a document information item MJ indicating a sheet color CA and the image of the second document C.

At step S203, the detection section 502 detects the sheet color CA based on the document information item MJ generated at Step S201.

At Step S205, the determination section 503 determines whether or not the sheet color CA indicated in the generated document information item MJ is the white color.

When it is determined that the sheet color CA detected by the detection section 502 is not the white color (NO at Step S205), the processing proceeds to Step S211. When it is determined that the sheet color CA detected by the detection section 502 is the white color (YES at Step S205), the processing proceeds to Step S207.

At Step S207, the determination section 503 determines that the document read by the reading section 501 at Step S201 is a first document R.

At Step S209, the controller 5 stores the document information item MJ generated at Step S201 in the storage 5B.

When a negative determination is made at Step S205, the determination section 503 determines at Step S211 that the document read by the reading section 501 at Step S201 is a second document C.

At Step S213, the division section 504 generates one group G including the document information item MJ of the second document C and the document information item MJ of the first document R read before the second document C is read.

At Step S215, the determination section 503 determines whether or not a color value of the sheet color CA detected by the detection section 502 falls in a color value range RC of any one of the specific colors SC other than the white color.

When it is determined that the color value of the sheet color CA does not fall in any of the color value ranges RC of the specific colors SC (NO at Step S215), the processing proceeds to Step S223 in FIG. 8. When it is determined that the color value of the sheet color CA falls in a color value range RC of one of the specific colors SC (YES at Step S215), the processing proceeds to Step S217.

At Step S217, the first decision section 505 decides a transmission address AD of the document information items MJ based on the color value range RC. Specifically, the first decision section 505 reads out a transmission address AD corresponding to the color value range RC of the one specific color SC from the color storage section 5B1 and decides the read transmission address AD as a transmission address AD of the document information items MJ.

At Step S219, the transmission section 506 reads out the document information items MJ included in the group G from the storage 5B and transmits the read document information items MJ to the decided transmission address AD.

At Step S221, the controller 5 determines whether or not any document remains on the feeding tray 31.

When the controller 5 determines that no document remains on the feeding tray 31 (NO at Step S221), the processing ends. When the controller 5 determines that any document remains on the feeding tray 31 (YES at Step S221), the processing returns to Step S201.

When a negative determination is made at Step S215, the receiving section 509 receives a transmission address AE based on user operation on the touch panel 41 at Step S223 in FIG. 8.

At Step S225, the second decision section 508 decides the transmission address AE as a transmission address AD of the document information items MJ included in the group G and the transmission section 506 reads out the document information items MJ from the storage 5B and transmits the read document information items MJ to the transmission address AD.

At Step S227, the controller 5 determines based on user operation on the touch panel 41 whether or not to register the transmission address AE received at Step S223.

When it is determined not to register the transmission address AE (NO at Step S227), the processing proceeds to Step S221 in FIG. 7. When it is determined to register the transmission address AE (YES at Step S227), the processing proceeds to Step S229.

At Step S229, the controller 5 calculates a color value of the sheet color CA of the second document C based on the document information item MJ generated for the second document C at Step S201 in FIG. 7 and displays the calculated color value on the touch panel 41.

At Step S231, the controller 5 determines a color value range RC of the sheet color CA of the second document C based on user operation on the touch panel 41.

At Step S233, the controller 5 stores the transmission address AE and the determined color value range RC in association with each other in the color storage section 5B1. The processing then proceeds to Step S221 in FIG. 7.

As described with reference to FIGS. 1 to 8, when the determination section 503 determines that the sheet color CA detected by the detection section 502 does not match any one of the specific colors SC, the receiving section 509 receives the transmission address AE. The second decision section 508 then decides the transmission address AE as a transmission address AD of the document information items MJ. In the above configuration, the document information items MJ can be transmitted to any transmission address AD that the user desires.

As described with reference to FIGS. 1 to 8, when it is determined that the sheet color CA detected by the detection section 502 does not match any one of the specific colors SC, the second decision section 508 decides the transmission address AE as the transmission address AD of the document information items MJ in the embodiment of the present disclosure, which however should not be taken to limit the present disclosure. It is only required that the second decision section 508 decides a transmission address AD of the document information items MJ. For example, the second decision section 508 may decide a preset transmission address AF as the transmission address AD. The preset transmission address AF preferably indicates an address of a personal computer 300 that an administrator of the image forming apparatus 100 uses, for example. In the above case, the administrator of the image forming apparatus 100 can transmit the document information items MJ to an appropriate transmission address AD.

Furthermore, the first decision section 505 decides a transmission address AD by reading out the transmission address AD from the color storage section 5B1 in the embodiment of the present disclosure, which however should not be taken to limit the present disclosure. It is only required that the first decision section 505 decides a transmission address AD based on the specific color SC. For example, the first decision section 505 may decide a transmission address AD based on a text TX described on a second document C.

Specifically, the acquisition section 507 acquires the text TX described on the second document C and the first decision section 505 decides a transmission address AD based on the text TX described on the second document C. More specifically, when the determination section 503 determines that the sheet color CA detected by the detection section 502 matches any one of the specific colors SC, the acquisition section 507 acquires text information contained in the document information item MJ indicating the sheet color CA of the second document C. The first decision section 505 then decides a transmission address AD based on the text information.

For example, an email address MA is described on a second document C as a text TX. The acquisition section 507 reads the email address MA, and the first decision section 505 decides the email address MA as a transmission address AD.

In the above case, when the determination section 503 determines that the sheet color CA matches any one of the specific colors SC, the acquisition section 507 acquires text information contained in the document information item MJ of the second document C for which it has been determined that the sheet color CA matches the specific color SC. The first decision section 505 then decides a transmission address AD based on the text information acquired by the acquisition section 507. In the above configuration, even in a situation with only two specific colors SC, many (e.g., 100) transmission addresses AD each represented by a text TX described on a second document C can be decided as transmission addresses AD to which the document information items MJ are to be transmitted. Thus, many transmission addresses AD can be decided with a simple configuration.

Figure 9:
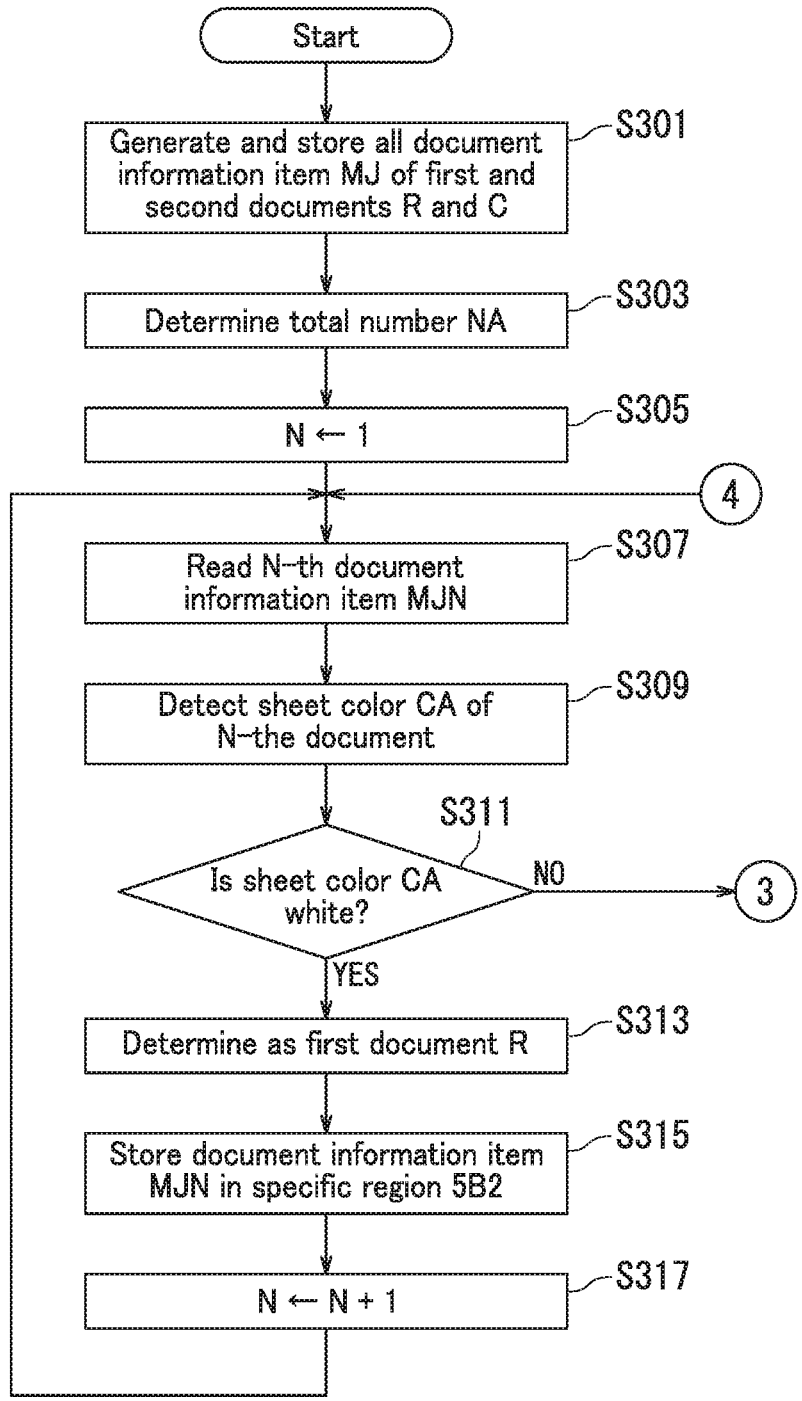
FIG. 9 is a flowchart depicting an example of processing that the controller performs other than the processing depicted in FIGS. 7 and 8.
Figure 10:
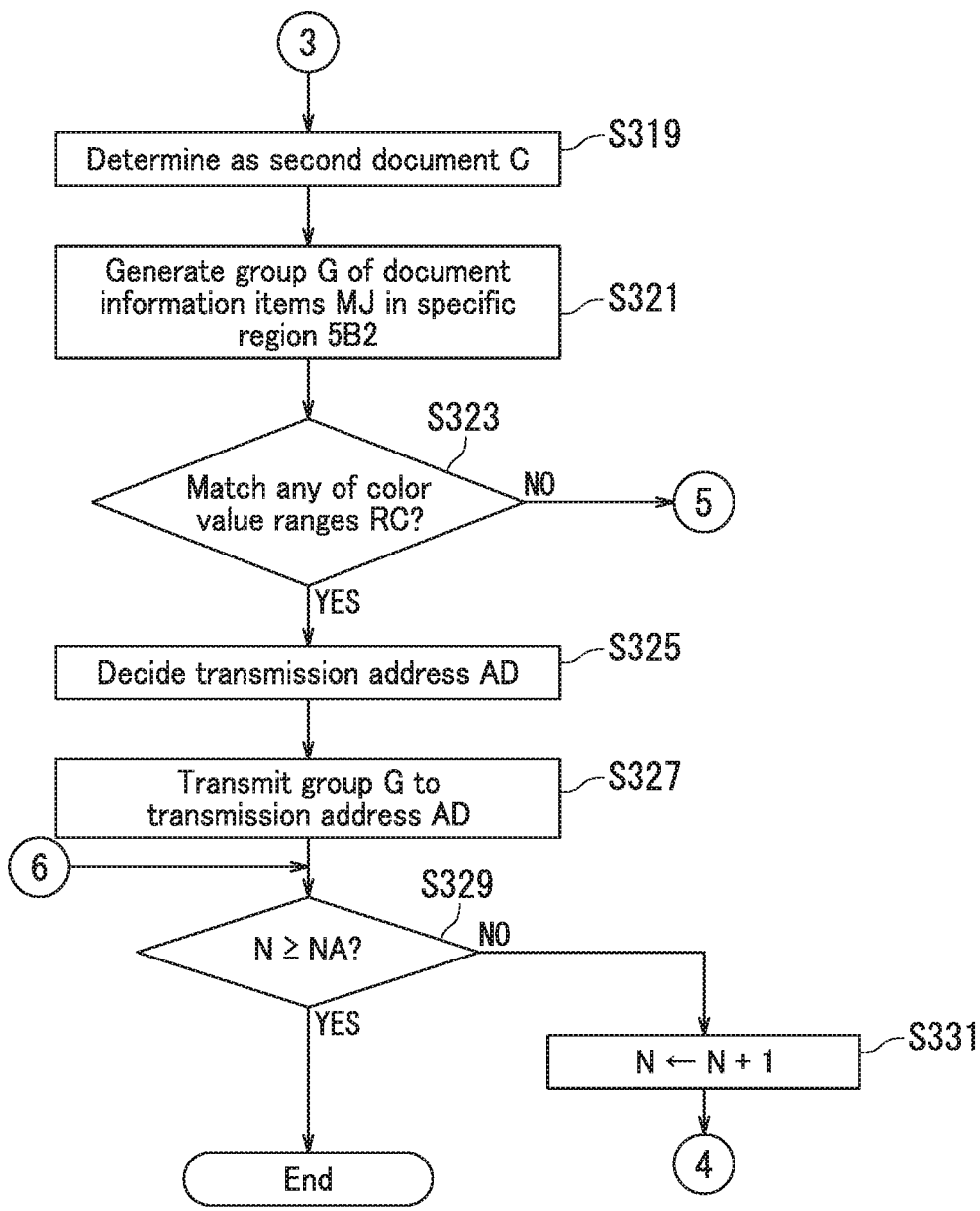
FIG. 10 is a flowchart depicting the example of processing that the controller performs other than the processing depicted in FIGS. 7 and 8.
Figure 11:
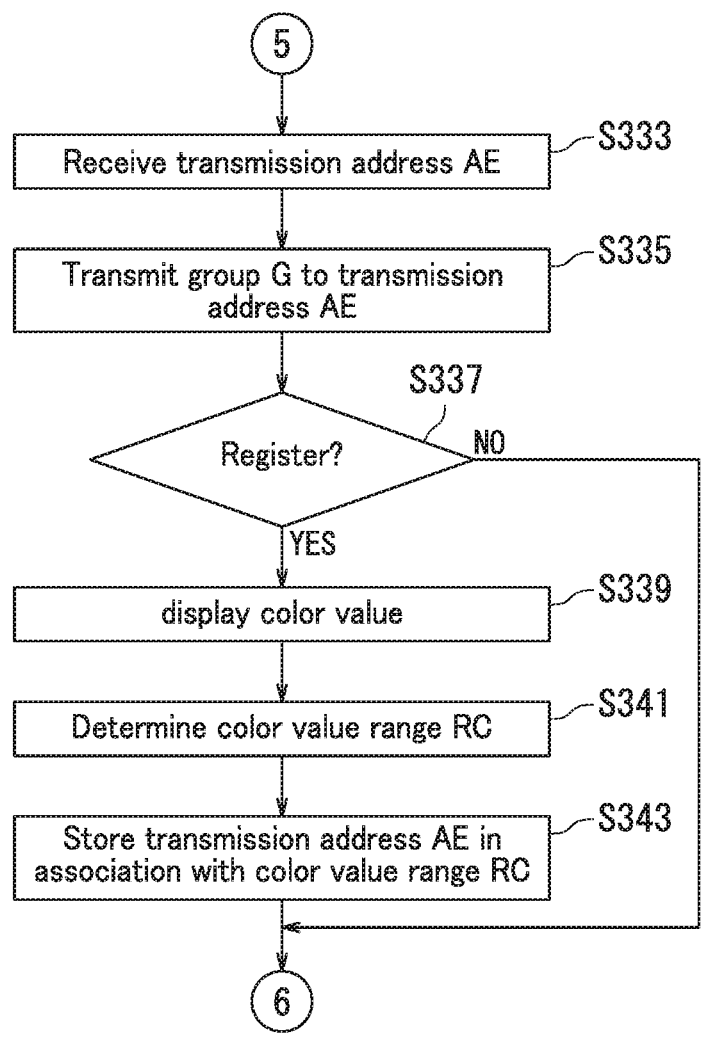
FIG. 11 is a flowchart depicting the example of processing that the controller performs other than the processing depicted in FIGS. 7 and 8.

The following further describes processing that the controller 5 performs with reference to FIGS. 1 to 11. FIGS. 9 to 11 are flowcharts depicting an example of processing that the controller 5 performs other than that depicted in FIGS. 7 and 8. The processing depicted in FIGS. 9 to 11 is different from that depicted in FIGS. 7 and 8 in that the reading section 501 sequentially reads images of all the first documents R and the second documents C loaded on the feeding tray 31 and generates document information items MJ.

In other words, a process for generating a document information item MJ, a process for dividing the document information items MJ, and a process for transmitting the document information items MJ are performed sequentially in the processing depicted in FIGS. 7 and 8. By contrast, in the processing depicted in FIGS. 9 to 11, a process for generating a document information item MJ is performed on all of the first documents R and the second documents C in a batch and a process for dividing the document information items MJ and a process for transmitting the document information items MJ are each performed on all of the first documents R and the second documents C in a batch. With reference to FIGS. 9 to 11, a case will be described in which each of the second documents C is placed beneath one of the first documents R corresponding to the second document C on the feeding tray 31, as illustrated in FIG. 6B.

First at Step S301, the reading section 501 sequentially reads images of all of the first documents R and the second documents C, generates respective document information items MJ indicating the images and sheet colors CA of the first documents R and the second documents C. and stores the generated document information items MJ in the storage 5B.

Next at step S303, the controller 5 determines a total number NA of the first documents R and the second documents C.

At Step S305, the controller 5 sets a counter value N to "1". The value N of a counter (counter value N) indicates what number a document corresponding to the document information item MJ under processing is among the first documents R and the second documents C.

At Step S307, the controller 5 reads out a document information item MJN corresponding to the N-th document from the storage 5B.

At Step S309, the detection section 502 detects a sheet color CA of the N-th document based on the document information item MJN.

At Step S311, the determination section 503 determines whether or not the detected sheet color CA is the white color.

When it is determined that the sheet color CA is not the white color (NO at Step S311), the processing proceeds to Step S319 in FIG. 10. When it is determined the sheet color CA is the white color (YES at Step S311), the processing proceeds to Step S313.

At Step S313, the determination section 503 determines that the N-th document is a first document R.

At Step S315, the controller 5 stores the document information item MJN in a specific region 5B2 of the storage 5B.

At Step S317, the controller 5 increments the counter value N by "1" and the processing returns to Step S307.

When a negative determination is made at S311, the determination section 503 determines that the N-th document is a second document C at Step S319 in FIG. 10.

At Step S321, the division section 504 generates one group G including a document information item MJ of the second document C and a document information item MJ stored in the specific region 5B2 of the storage 5B.

At Step S323, the determination section 503 determines whether or not a color value of the sheet color CA of the N-th document falls in a color value range RC of any one of the specific colors SC other than the white color.

When it is determined that the color value of the sheet color CA of the N-th document does not fall in any of the color value ranges RC of the specific colors SC (NO at Step S323), the processing proceeds to Step S333 in FIG. 11. When it is determined that the color value of the sheet color CA of the N-th document falls in a color value range RC of any one of the specific colors SC (YES at Step S323), the processing proceeds to Step S325.

At Step S325, the first decision section 505 decides a transmission address AD of the document information items MJ included in the group G based on the color value range RC. Specifically, the first decision section 505 reads out a transmission address AD corresponding to the color value range RC of the one specific color SC from the color storage section 5B1 of the storage 5B and decides the read transmission address AD as the transmission address AD of the document information items MJ.

At Step S327, the transmission section 506 reads out the document information items MJ included in the group G from the specific region 5B2 and transmits the read document information items MJ to the decided transmission address AD.

At Step S329, the controller 5 determines whether or not the counter value N is equal to or larger than the total number NA of the documents.

When it is determined that the counter value N is equal to or larger than the total number NA of the documents (YES at Step S329), the processing ends. When it is determined that the counter value N is smaller than the total number NA of the documents (NO at Step S329), the controller 5 increments the counter value N by "1" and the processing returns to Step S307.

When a negative determination is made at Step S323, the receiving section 509 receives a transmission address AE based on user operation on the touch panel 41 at Step S333 in FIG. 11.

At Step S335, the second decision section 508 decides the transmission address AE as a transmission address AD of the document information items MJ, and the transmission section 506 reads out the document information items MJ included in the group G from the specific region 5B2 and transmits the read document information items MJ to the transmission address AE.

At Step S337, the controller 5 determines based on user operation on the touch panel 41 whether or not to register the transmission address AE.

When it is determined not to register the transmission address AE (NO at Step S337), the processing proceeds to Step S329 in FIG. 10. When the controller 5 determines to register the transmission address AE (YES at Step S337), the processing proceeds to Step S339.

At Step S339, the controller 5 calculates a color value of the sheet color CA of the second document C based on the document information item MJ of the N-th document and displays the calculated color value on the touch panel 41.

At Step S341, the controller 5 determines a color value range RC corresponding to the specific color SC based on user operation on the touch panel 41.

At Step S343, the controller 5 stores the transmission address AE and the determined color value range RC in association with each other in the color storage section 5B1. The processing then proceeds to Step S329 in FIG. 10.

As described with reference to FIGS. 1 to 11, it is possible that the reading section 501 sequentially reads images of all of the first documents R and the second documents C loaded on the feeding tray 31, generates document information items MJ, and stores the generated document information items MJ in the storage 5B. In the above configuration, reading images of all of the first documents R and the second documents C is completed in an early stage, with a result that a time period for which the image reading unit 2 and the document conveyance unit 3 are used can be shortened. Thus, user convenience can be increased.

An embodiment of the present disclosure has been described so far with reference to the accompanying drawings. However, the present disclosure is not limited to the above embodiment and can be practiced in various ways without departing from the scope of the present disclosure (for example, (1) to (3) below). The drawings are schematic illustrations that emphasize elements of configuration in order to facilitate understanding thereof, and thickness, length, the numbers, and the like of elements of configuration illustrated in the drawings may differ from actual ones thereof in order to facilitate preparation of the drawings. The shapes, dimensions, and the like of the elements of configurations in the above embodiment are only examples that do not impose any particular limitations and can be altered in various ways to the extent that there is not substantial deviation from the configuration of the present disclosure.

(1) A configuration in which the image reading device constitutes the image forming apparatus 100 is described with reference to FIGS. 1 and 2, which however should not be taken to limit the present disclosure. It is only required that the image reading device includes at least the image reading unit 2 and the controller 5. Preferably, the image reading device further includes the document conveyance unit 3. In the above configuration, the second documents C and the first documents R loaded on the feeding tray 31 can be conveyed by the document conveyance unit 3 and read by the image reading device. Preferably, the image reading device further includes the operation display section 4. In the above configuration, user operation can be received.

(2) A configuration employing the SMTP as a protocol used for transmission of document information items MJ is described with reference to FIGS. 1 to 5, which however should not be taken to limit the present disclosure. It is only required to employ a protocol that enables transmission of document information items MJ. For example, a FTP or a SMB may be employed as the protocol.

(3) A configuration in which the basic color is the white color is described with reference to FIGS. 1 to 11, which however should not be taken to limit the present disclosure. It is only required that the basic color is different from the specific colors SC. For example, the basic color may be a yellow color. In addition, the basic color may include two or more colors.

What is claimed is:

1. An image reading device capable of reading an image described on a document, comprising:
   a reading section configured to read the document and generate a document information item indicating the image and a color of a recording medium of the document;
   a detection section configured to detect the color of the recording medium of the document based on the document information item;
   a determination section configured to determine whether or not the color of the recording medium of the document matches any one specific color of a plurality of specific colors;
   a decision section configured to decide a transmission address of the document information item based on the one specific color when the determination section determines that the color of the recording medium of the document matches the one specific color;
   a feeding section; and
   a division section configured to divide a plurality of the document information items each corresponding to one of the first documents and the second documents, wherein
   the document includes a plurality of first documents and a plurality of second documents,
   the first documents each are a document of which a color of a recording medium is a basic color,
   the basic color is a color that does not match any one of the specific colors,
   the second documents each are a document of which a color of a recording medium matches any one of the specific colors,
   the feeding section sequentially feeds the first documents and the second documents to the reading section, the first documents and the second documents being stacked on the feeding section,
   the number of the second documents is a specific number, the specific number being equal to or larger than 2,
   the first documents include the specific number or more of sheets,
   the first documents and the specific number of second documents are stacked on the feeding section in one-to-one correspondence with one another,
   the reading section reads an image of one second document of the second documents directly before an image of one first document of the first documents is read, and generates the document information items, the one first document being associated with the one second document,
   the division section divides the document information items into the specific number of document information item groups between respective document information items each corresponding to one second document of the second documents and a document information item corresponding to one first document of the first documents that is read directly before the one second document, and
   the document information item groups each contain a document information item corresponding to one second document of the second documents and a document information item corresponding to one first document of the first documents that is associated with the one second document.

2. The image reading device according to claim 1, further comprising
   a color storage section that stores therein information items indicating the respective specific colors in association with information items indicating respective transmission addresses, wherein
   when the determination section determines that the color of the recording medium of the document matches the one specific color, the decision section reads out a transmission address corresponding to the one specific color from the color storage section and decides the read transmission address as the transmission address of the document information item.

3. The image reading device according to claim 2, wherein
the document information items indicating the respective specific colors each contain information indicating a color value range of a corresponding one of the specific colors, and
the determination section determines whether or not the color of the recording medium of the document matches any one specific color of the specific colors based on the color value ranges.

4. The image reading device according to claim 1, further comprising
an acquisition section configured to acquire text information contained in the document information item when the determination section determines that the color of the recording medium of the document matches the one specific color, wherein
the decision section decides the transmission address of the document information item based on the text information acquired by the acquisition section.

5. The image reading device according to claim 1, wherein
the determination section further determines whether or not the color of the recording medium of the document is the basic color,
and
when the determination section determines that the color of the recording medium of the document is not the basic color and does not match any one of the specific colors, the decision section decides the transmission address of the document information item.

6. The image reading device according to claim 5, further comprising
a receiving section configured to perform transmission address reception, wherein
when the determination section determines that the color of the recording medium of the document is not the basic color and does not match any one of the specific colors, the receiving section receives a transmission address, and
the decision section decides the transmission address received by the receiving section as the transmission address of the document information item.

7. The image reading device according to claim 1, further comprising
a transmission section configured to transmit the specific number of document information item groups to respective transmission addresses decided by the decision section.

8. The image reading device according to claim 1, wherein
the basic color is a white color, and
the specific colors include at least one of a red color, a green color, and a blue color.

9. An image reading device capable of reading an image described on a document, comprising:
a reading section configured to read the document and generate a document information item indicating the image and a color of a recording medium of the document;
a detection section configured to detect the color of the recording medium of the document based on the document information item;
a determination section configured to determine whether or not the color of the recording medium of the document matches any one specific color of a plurality of specific colors;
a decision section configured to decide a transmission address of the document information item based on the one specific color when the determination section determines that the color of the recording medium of the document matches the one specific color;
a feeding section; and
a division section configured to divide a plurality of the document information items each corresponding to one of the first documents and the second documents, wherein
the document includes a plurality of first documents and a plurality of second documents,
the first documents each are a document of which a color of a recording medium is a basic color,
the basic color is a color that does not match any one of the specific colors,
the second documents each are a document of which a color of a recording medium matches any one of the specific colors,
the feeding section sequentially feeds the first documents and the second documents to the reading section the first documents and the second documents being stacked on the feeding section,
the number of the second documents is a specific number, the specific number being equal to or larger than 2,
the first documents include the specific number or more of sheets,
the first documents and the second documents are stacked on the feeding section in one-to-one correspondence with one another,
the reading section reads an image of one second document of the second documents directly after an image of one first document of the first documents is read, and generates the document information items, the one first document being associated with the one second document,
the division section divides the document information items into the specific number of document information item groups between each document information item corresponding to one second document of the second documents and a document information item corresponding to one first document of the first documents that is read directly after the one second document is read, and
the document information item groups each contain a document information item corresponding to one second document of the second documents and a document information item corresponding to one first document of the first documents that is associated with the one second document.

10. An image forming apparatus including an image reading device that reads an image described on a document, comprising:
a reading section configured to read the document and generate a document information item indicating the image and a color of a recording medium of the document;
a detection section configured to detect the color of the recording medium of the document based on the document information item;
a determination section configured to determine whether or not the color of the recording medium of the document matches any one specific color of a plurality of specific colors;
a decision section configured to decide a transmission address of the document information item based on the one specific color when the determination section determines that the color of the recording medium of the document matches the one specific color;

an image forming section configured to form an image on another recording medium, a feeding section; and a division section configured to divide a plurality of the document information items each corresponding to one of the first documents and the second documents, wherein the document includes a plurality of first documents and a plurality of second documents, the first documents each are a document of which a color of a recording medium is a basic color, the basic color is a color that does not match any one of the specific colors, the second documents each are a document of which a color of a recording medium matches any one of the specific colors, the feeding section sequentially feeds the first documents and the second documents to the reading section, the first documents and the second documents being stacked on the feeding section, the number of the second documents is a specific number, the specific number being equal to or larger than 2, the first documents include the specific number or more of sheets, the first documents and the specific number of second documents are stacked on the feeding section in one-to-one correspondence with one another, the reading section reads an image of one second document of the second documents directly before an image of one first document of the first documents is read, and generates the document information items, the one first document being associated with the one second document, the division section divides the document information items into the specific number of document information item groups between respective document information items each corresponding to one second document of the second documents and a document information item corresponding to one first document of the first documents that is read directly before the one second document, and the document information item groups each contain a document information item corresponding to one second document of the second documents and a document information item corresponding to one first document of the first documents that is associated with the one second document.

11. The image forming apparatus according to claim 10, further comprising:

a transmission section configured to transmit a plurality of the document information items to the transmission address decided by the decision section; and storage that stores therein information items indicating the respective specific colors in association with information items indicating respective transmission addresses, wherein when the determination section determines that the color of the recording medium of the document matches the one specific color, the decision section reads out a transmission address corresponding to the one specific color from the storage and decides the read transmission address as the transmission address of the document information item, and the image forming section forms an image indicating the one specific color and an image indicating the decided transmission address in association with each other on the other recording medium other than the recording medium of the document.

12. The image forming apparatus according to claim 11, wherein the information items indicating the respective specific colors each contain information indicating ranges of an R color component, a G color component, and a B color component of a corresponding one of the specific colors.

\* \* \* \* \*